United States Patent
Gandhi et al.

(10) Patent No.: US 12,014,203 B2
(45) Date of Patent: Jun. 18, 2024

(54) COMMUNICATIONS ACROSS PRIVILEGE DOMAINS WITHIN A CENTRAL PROCESSING UNIT CORE

(71) Applicant: VMware LLC, Palo Alto, CA (US)

(72) Inventors: Jayneel Gandhi, Sunnyvale, CA (US); Sujay Yadalam Sudarshan, Madison, WI (US)

(73) Assignee: VMware LLC, Palo Alto, CA (US)

( * ) Notice: Subject to any disclaimer, the term of this patent is extended or adjusted under 35 U.S.C. 154(b) by 210 days.

(21) Appl. No.: 17/533,625

(22) Filed: Nov. 23, 2021

(65) Prior Publication Data
US 2023/0161616 A1    May 25, 2023

(51) Int. Cl.
*G06F 9/46* (2006.01)
*G06F 9/4401* (2018.01)
*G06F 9/445* (2018.01)
*G06F 9/455* (2018.01)
*G06F 9/54* (2006.01)

(52) U.S. Cl.
CPC ............ *G06F 9/461* (2013.01); *G06F 9/4403* (2013.01); *G06F 9/44505* (2013.01); *G06F 9/45558* (2013.01); *G06F 9/545* (2013.01)

(58) Field of Classification Search
CPC .... G06F 9/461; G06F 9/4403; G06F 9/44505; G06F 9/45558; G06F 9/545; G06F 2009/45587
See application file for complete search history.

(56) References Cited

U.S. PATENT DOCUMENTS

| | | | |
|---|---|---|---|
| 5,906,002 A * | 5/1999 | Lee | G06F 9/30112 712/225 |
| 2005/0138628 A1* | 6/2005 | Bradford | G06F 12/0862 712/E9.055 |
| 2005/0172138 A1* | 8/2005 | Ezzat | G06F 21/52 713/189 |
| 2007/0124729 A1* | 5/2007 | Ko | G06F 9/485 718/100 |
| 2010/0058045 A1* | 3/2010 | Borras | G06F 9/4401 711/E12.008 |
| 2010/0083261 A1* | 4/2010 | Jayamohan | G06F 9/461 718/102 |
| 2011/0083132 A1* | 4/2011 | Laor | G06F 9/45533 718/1 |
| 2015/0178078 A1* | 6/2015 | Anvin | G06F 9/30101 712/208 |
| 2015/0317161 A1* | 11/2015 | Murphy | G06F 9/461 712/228 |
| 2016/0224485 A1* | 8/2016 | Ibrahim | G06F 13/32 |

(Continued)

Primary Examiner — Faisal M Zaman
(74) Attorney, Agent, or Firm — King Intellectual Asset Management

(57) ABSTRACT

Systems and methods are described for communications across privilege domains within a central processing unit ("CPU") core. The CPU core can store a kernel context associated with an operating system within the CPU. An application can request access to the CPU, and the CPU can load a user context associated with the application into the CPU. The CPU can execute instructions from the application while both the kernel context and the user context persist in the CPU. Because both contexts are stored on the CPU, the CPU can switch contexts without loading or unloading context data from memory.

20 Claims, 6 Drawing Sheets

(56) References Cited

U.S. PATENT DOCUMENTS

| | | | | |
|---|---|---|---|---|
| 2016/0314024 | A1* | 10/2016 | Chang | G06F 1/3287 |
| 2018/0033114 | A1* | 2/2018 | Chen | G06T 15/80 |
| 2018/0248974 | A1* | 8/2018 | Zhuang | H04L 67/01 |
| 2019/0018794 | A1* | 1/2019 | Beard | G06F 9/30123 |
| 2020/0073694 | A1* | 3/2020 | Wallach | G06F 12/1491 |
| 2020/0073711 | A1* | 3/2020 | He | G06F 9/3009 |
| 2021/0096908 | A1* | 4/2021 | Opferman | G06F 9/449 |
| 2021/0357267 | A1* | 11/2021 | Beale | G06F 9/355 |
| 2023/0135295 | A1* | 5/2023 | Cha | G06F 16/172 |
| | | | | 719/329 |

\* cited by examiner

COMMUNICATIONS ACROSS PRIVILEGE DOMAINS WITHIN A CENTRAL PROCESSING UNIT CORE

BACKGROUND

Some central processing units ("CPUs") implement a privileged domain architecture when executing instructions from applications and services on a computing device. As an example, a CPU can have a higher privilege domain designated for operating system kernel operations and one or more lower privilege domains, such as a user domain for user applications. The CPU can restrict certain operations to only the higher privilege domain, such as, for example, accessing different address spaces, memory management hardware, and I/O ports. For an application to perform such an operation, the application must request that the operation be performed on the higher privilege domain. This requires the CPU to perform a context switch, in which the CPU changes from operating using context data for the user domain to using context data for the kernel domain.

One problem with this structure is that CPUs have very limited storage space, and consequently only store context data for one privilege domain at a time. When a context switch is required, the CPU must retrieve the required context from the computing device's memory and store the other context into the memory. For example, if a CPU is performing lower privilege operations for an application, the CPU does so with the user context stored in the CPU and the kernel context stored in the memory. When the application requests an operation that required the higher privilege domain, the CPU must move the user context to the memory and retrieve the kernel context from the memory. This memory switch takes time, thereby reducing the CPU's efficiency while it waits for context data every time a context switch occurs.

To address context switching delays, current solutions require additional hardware that is very expensive. For example, simultaneous multithreading ("SMT") allows operations on multiple domains to run simultaneously on a CPU core using threads. However, SMT methods require CPUs to store context data for each thread on the CPU, which is costly due to the CPUs limited storage capabilities.

As a result, a need exists for more efficient context switching in a CPU core that requires reduced storage space on the CPU.

SUMMARY

Examples described herein include systems and methods for communications across privilege domains within a CPU core. In an example, a CPU on a computing device can utilize a privilege domain architecture that includes two or more hierarchical access domains. The highest domain, or kernel domain, can grant unrestricted access to execute all instructions, including privileged instructions, and access otherwise restricted components of the computing device, including, for example, different address spaces, memory management hardware, and I/O ports. A lower privilege domain can be any domain with limited access to CPU operations. For example, lower privilege domains can be restricted from performing operations restricted to the kernel level.

In an example, the core in the CPU can store multiple contexts simultaneously. A context can include operational state data and execution settings for a process thread executing on the CPU core. For example, a context can include address space, stack space, virtual address space, process states, program counters, and registers, such as instruction registers, hardware registers, floating point registers, and so on. The CPU core can use data from a context to execute instructions from the corresponding application or service. For example, the CPU core can store a kernel context for operations performed on the kernel domain and a user context for operations performed on an application's lower domain, or a user domain. With both contexts stored in the CPU core, the CPU core can switch between contexts without needing to retrieve any context data from the computing device's memory. In such an example, the CPU also only needs to store two contexts simultaneously.

To store multiple contexts simultaneously, the processor hardware can hold multiple contexts simultaneously. The processor register file can simultaneously hold a first set of registers for the user space and a second set of registers for the kernel space. Unlike with SMT, either the user thread or the kernel thread is running at any one time, but not both together. However, on a transition from user mode to kernel mode, physical registers corresponding to the user thread can be retained in the core and are not overwritten by the kernel thread, and vice versa. This can reduce the number of resources that are duplicated and can also reduce the overhead required to execute multiple threads at the same time, in an example.

In one example, the CPU, or each of its cores, can include a preload queue, which can be a storage area on the CPU where the CPU stores contexts for applications or services scheduled to access the CPU. For example, the CPU core can store the kernel context and a first user context for a first application in the CPU core while the first application has access to the CPU core. If a second application requests access to the CPU core, the CPU core can retrieve a second user context for the second application from the computer device's memory. While the CPU core is retrieving the second user context, the CPU core can continue to execute instructions from the first application. After the second context is loaded into the preload queue and is scheduled to access the CPU core, the CPU core can move the first user context to the memory and load the second user context into the CPU. The CPU core can then execute instructions from the second application, switching contexts between the kernel context and second user context without needing to retrieve any context data from the computing device's memory. In one example where the first application is scheduled to access the CPU core again after the second application, the first user context can be loaded into the preload queue instead of the memory.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for communications across privilege domains within a CPU core. The CPU core can store a kernel context associated with an operating system within the CPU. An application can request access to the CPU, and the CPU can load a user context associated with the application into the CPU, or one of its cores. The CPU core can execute instructions from the application while both the kernel context and the user context persist in the CPU. Because both contexts are stored on the CPU core, such as in two sets of registers, the CPU core can switch contexts without loading or unloading context data from memory outside of the CPU. Additionally, the CPU core need only store two contexts simultaneously.

Figure 1:
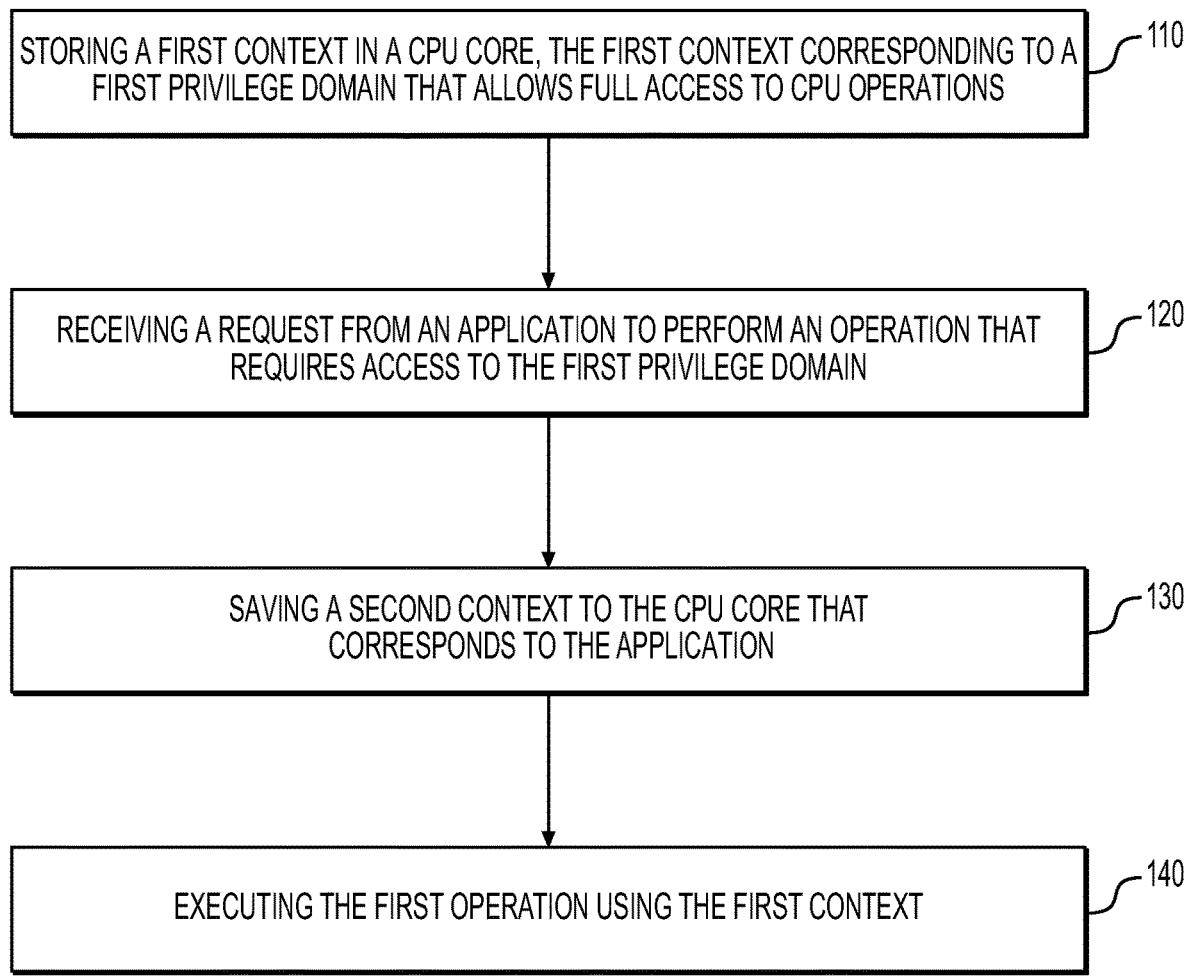
FIG. 1 is a flowchart of an example method for communications across privilege domains within a CPU core.
Figure 2:
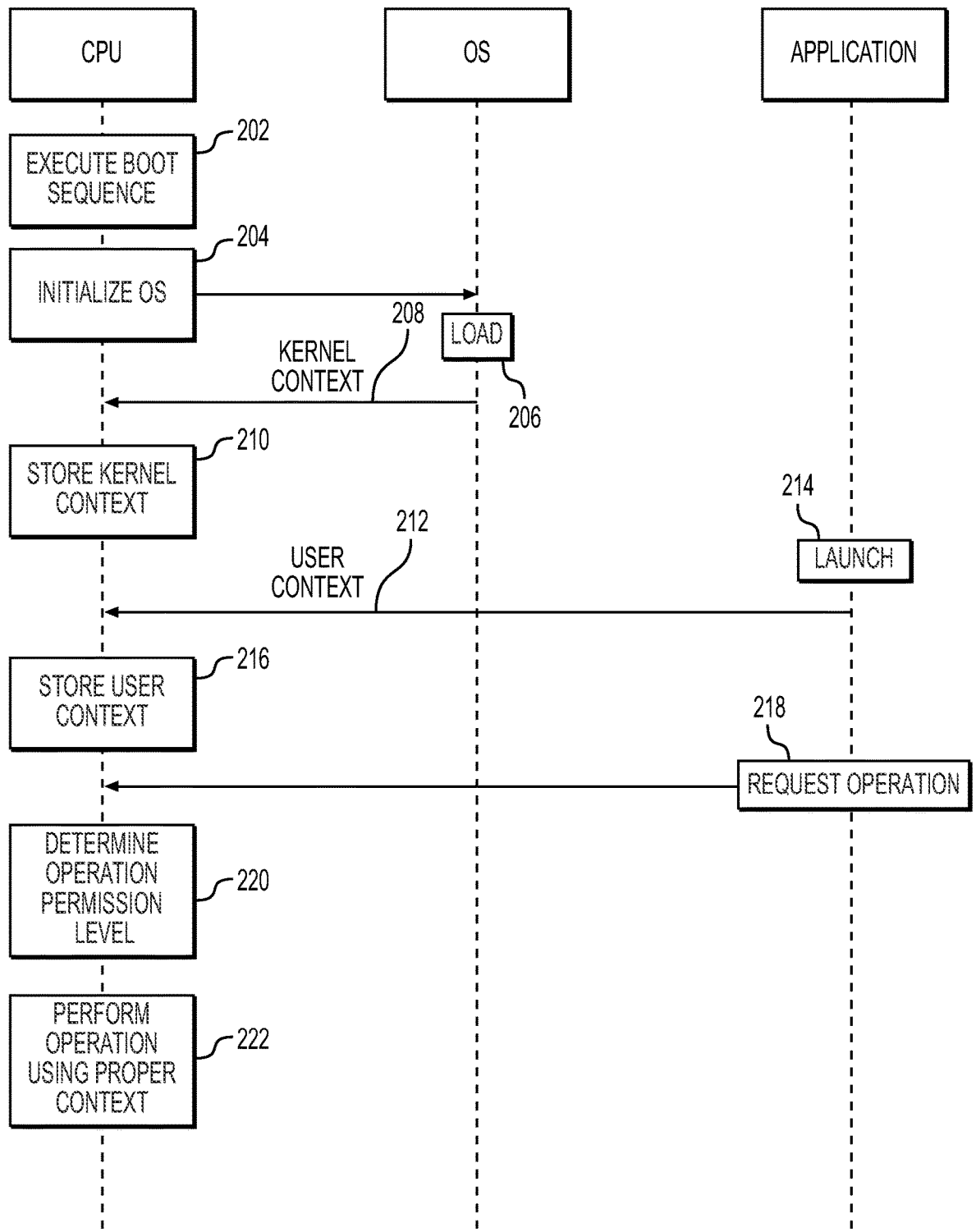
FIG. 2 is a sequence diagram of an example method for communications across privilege domains within a CPU core.
Figure 3:
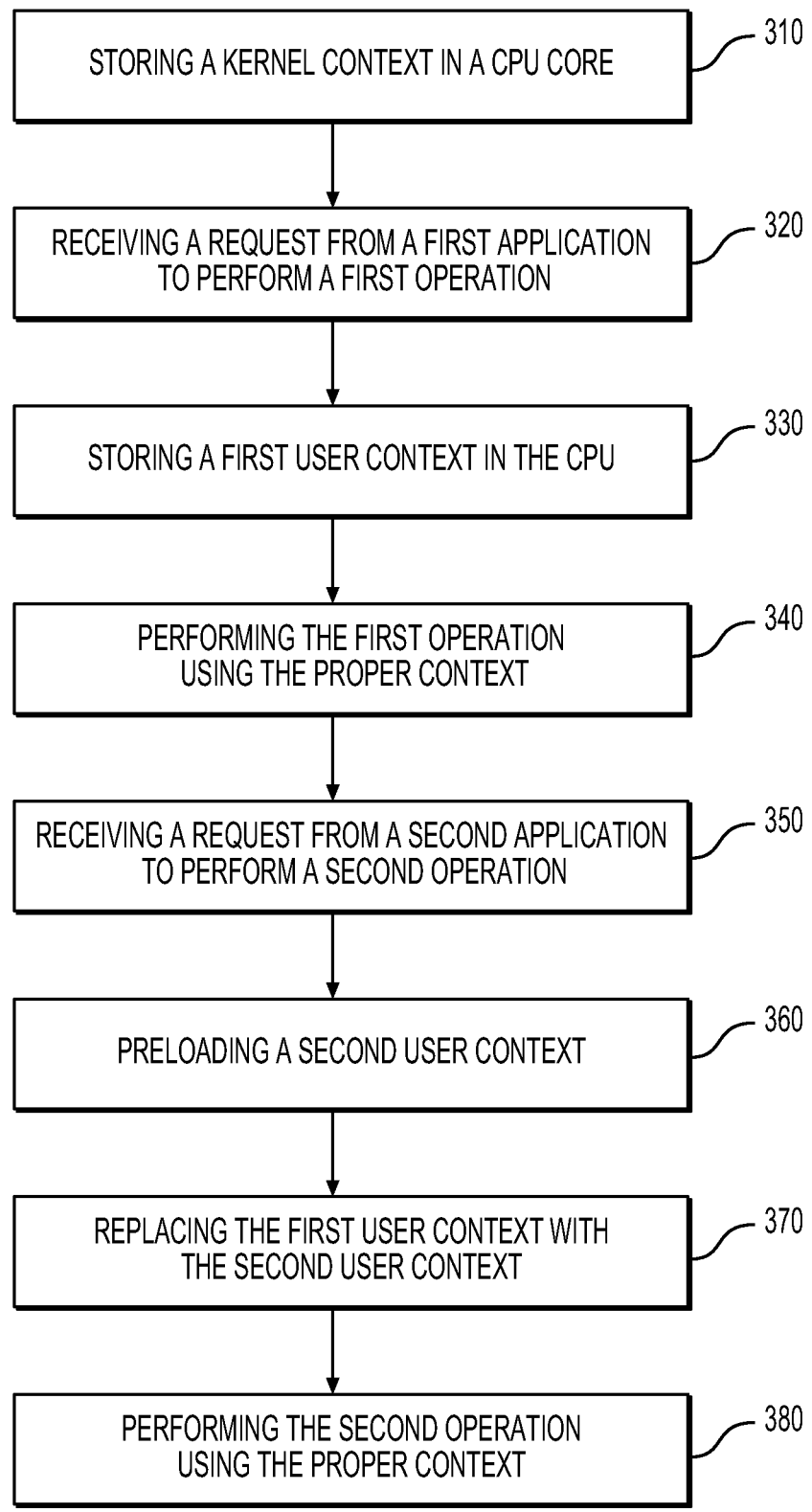
FIG. 3 is another flowchart of an example method for communications across privilege domains within a CPU core.
Figure 4:
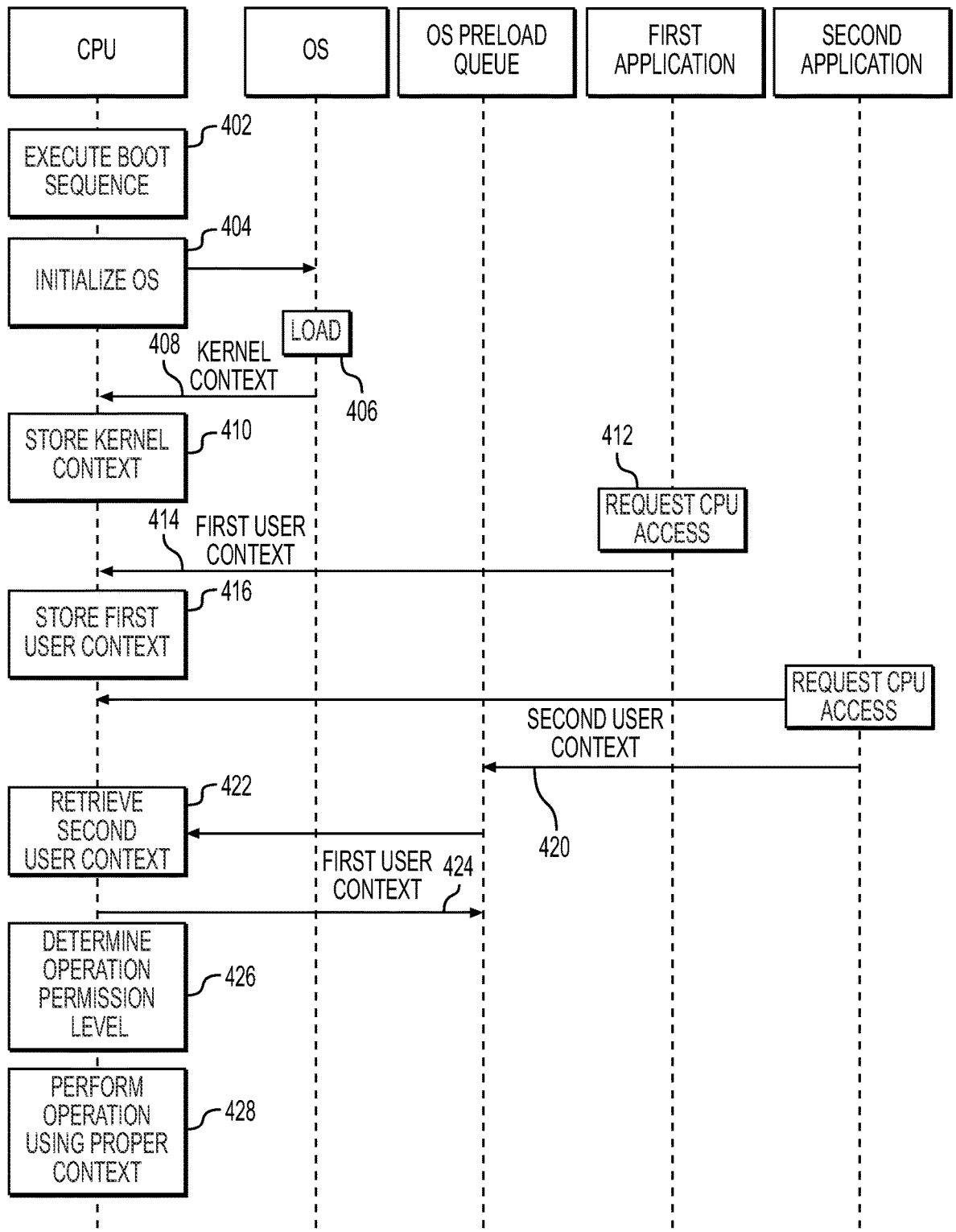
FIG. 4 is another sequence diagram of an example method for communications across privilege domains within a CPU core.
Figure 5:
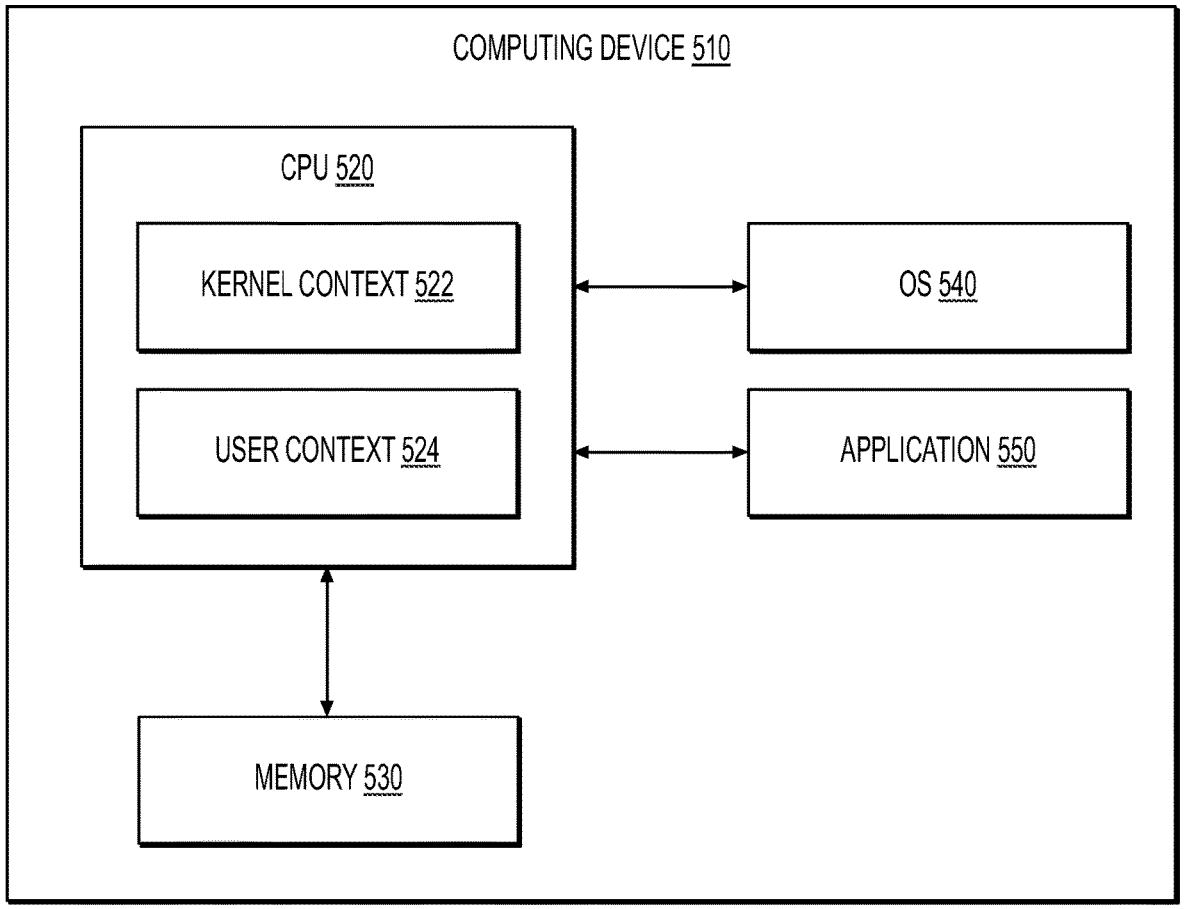
FIG. 5 is an illustration of an example system for performing communications across privilege domains within a CPU core.
Figure 6:
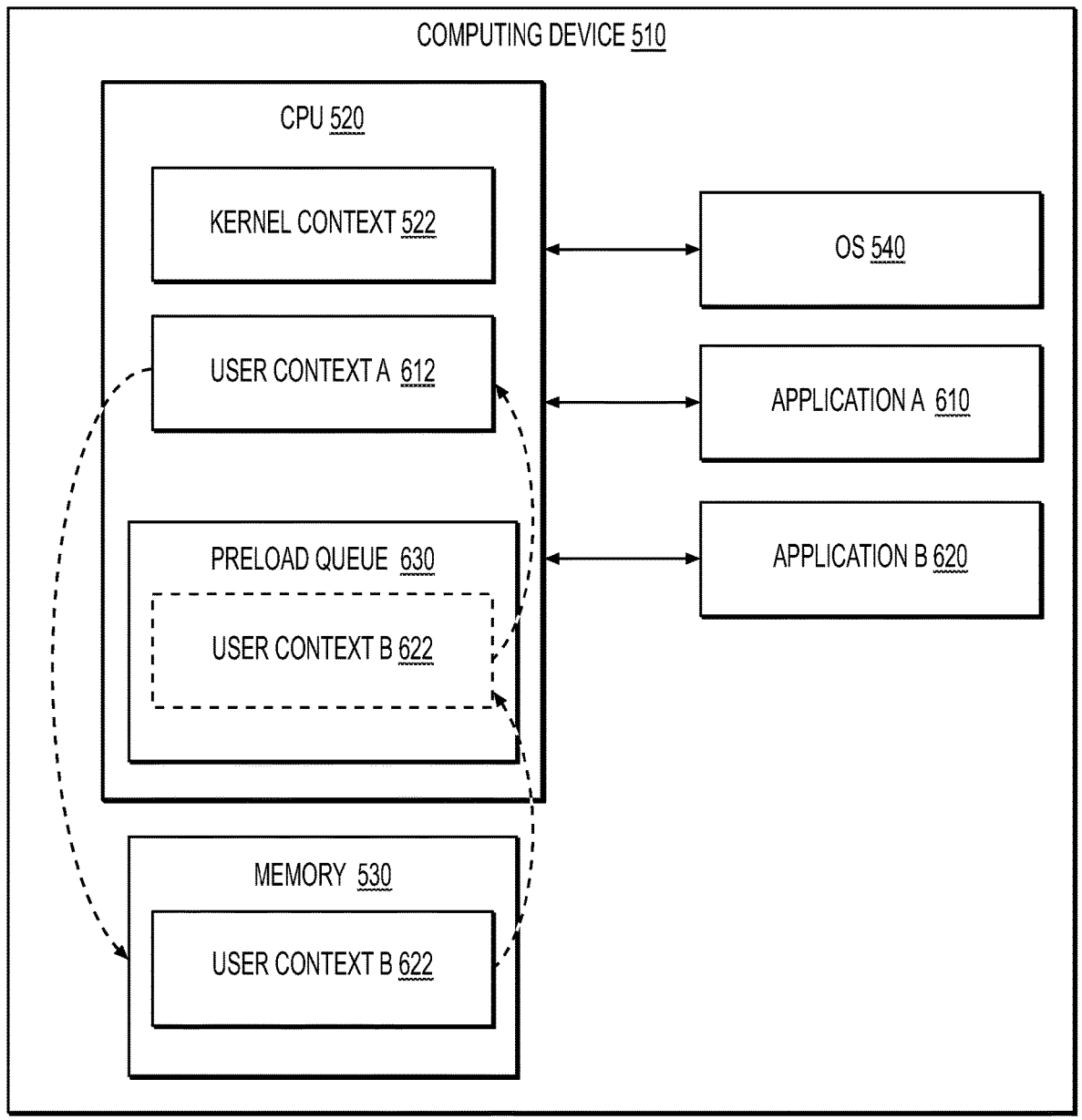
FIG. 6 is another illustration of an example system for performing communications across privilege domains within a CPU core.

FIGS. 1 and 2 illustrate a method and sequence diagram for communications across privilege domains within a CPU core that include a single application accessing the CPU core. FIGS. 3 and 4 illustrate a method and sequence diagram for communications across privilege domains within a CPU core that include a second application accessing the CPU core when a first application is already accessing the CPU core. FIGS. 5 and 6 are system diagrams for a computing device with a CPU core that can perform the methods describe herein. References are made herein to both a "CPU" and a "CPU core" performing certain actions. These references are made interchangeably and are not meant to be limiting in any way. This is at least because a CPU can include multiple cores that operate independent of one another. Accordingly, references to a CPU performing an action can also mean any core on the CPU performing said action.

FIG. 1 is a flowchart of an example method for communications across privilege domains within a CPU core. At stage 110, the CPU core can store a first context in the CPU register. The CPU register can be a storage component of the CPU that allows quick access to certain data. Data stored on the CPU register can be accessed more quickly than data stored on memory outside the CPU, such as random-access memory ("RAM") or a hard drive, of a computing device that the CPU belongs to.

A context can include operational state data and execution settings for a process thread executing on the CPU core. For example, a context can include address space, stack space, virtual address space, process states, program counters, and registers, such as instruction registers, hardware registers, floating point registers, and so on. When access for a process is removed from the CPU core, the CPU core can store the process's context in the CPU registers, which preserves the state of the process when it loses access. When the process is scheduled to access the CPU core again, the CPU core can resume operations for the process using the context stored in the CPU registers. Because the context is stored on the CPU registers, the CPU core does not need to retrieve the context from the memory, which can save time whenever a context switch occurs.

In an example, the first context can correspond to a kernel process of the computing device's OS. The term "kernel context" is used throughout to refer to a context that includes operational state data for the OS kernel. The first context can be an example of such a kernel context. The kernel can operate within the highest privilege domain that gives the kernel unrestricted access to execute all instructions, including privileged instructions, and access otherwise restricted components of the computing device. As an example, only the kernel domain can access a different address space, memory management hardware, and input/output ("I/O") ports. In an example, when the kernel has access to a CPU core, the CPU core can execute the kernel operations using data from the first context that is stored in the CPU registers. Hereinafter, this highest-level privilege domain is referred to interchangeably as the "kernel domain" or "kernel level."

At stage 120, the CPU core can receive a request from an application to perform an operation that requires access to a first privilege domain. The application can be any kind of application or service on the OS that access to a lower privilege domain than the kernel domain. A lower privilege domain can be any domain with limited access to CPU operations. For example, lower privilege domains can be restricted from performing operations restricted to the kernel level. Hereinafter, all lower privilege domains are referred to interchangeably as the "user domains" or "user levels." The examples herein describe a domain privilege architecture that includes two domains: one kernel domain and one user domain. However, the CPU core can have more than two privilege domains, such as three or four.

At stage 130, the CPU core can store a second context to the CPU register. The CPU register can refer to a plurality of registers that can include multiple sets of registers used to store different contexts. The term "user context" is used throughout to refer to a context that includes operational state data for a user level process thread. The second context can be an example of such a user context. In an example, when an application requests an operation from the CPU, the CPU can load the application's user context into the CPU register. In one example, the kernel context can persist in the CPU register. Because of limited storage space in the CPU register, user contexts can be stored elsewhere when not in use, such as in the RAM or hard drive of the computing device. When an application requests that the CPU perform an operation, the CPU can retrieve the application's user context. The kernel context and user context can simultaneously persist in the CPU register.

In an example, the CPU can have enough storage space in the CPU register to simultaneously store the kernel context and the user context. In examples where the CPU has multiple cores, the CPU can have enough storage space to store the kernel context and user contexts for each core.

Returning to the operation request described at stage 120, the CPU core can perform the requested operation using the kernel context at stage 140. Because the kernel context persists in the CPU register, the CPU core can perform the operation without having to switch out contexts. In this example, the CPU also only needs to store two contexts simultaneously. However, only the user thread or kernel thread executes in the CPU core at one time, in an example, while the contexts both persist in the registers. The CPU core can perform the operation using the data from the kernel context already stored in the CPU register. In an example, after performing the operation, the CPU can return to performing operations using the user context of the application stored in the CPU.

In one example, to further increase efficiency of the CPU, the CPU can be configured to reduce its polling rate. For example, CPUs that use a polling protocol steadily check whether a device needs attention from the CPU. This can occur as frequently as once per CPU cycle. The CPU wastes resources each time it polls a device that does not need its attention. To reduce this waste, the CPU polling rate can be reduced to a rate that minimizes delays caused by the less frequent polling. For example, instead of polling every CPU cycle, the CPU can poll every 10 or 50 cycles. Any delay caused by less frequent polling can be nullified by the increased CPU speed that results from the CPU using the extra resources gained.

FIG. 2 is a sequence diagram of an example method for communications across privilege domains within a CPU core, such as the method described above regarding FIG. 1. At stage 202, the CPU core can execute a boot sequence. For example, a user can power on or restart the computing device that the CPU belongs to. In an example, the CPU can execute a boot sequence code that causes the CPU to launch a Basic Input/Output ("BIOS") or Unified Extensible Firmware Interface ("UEFI") that initializes other hardware on the computing device and facilitates communication between the computing device's OS and hardware.

At stage 204, the CPU core can initialize the OS. For example, the CPU core can execute code that causes the OS to start loading. At stage 206, the OS can load. When the OS loads enough to begin sending instructions to the CPU core, the OS can send the kernel context to the CPU core at stage 208. The kernel context can include operational state data and execution settings for kernel level operations on the CPU core. At stage 210, the CPU core can store the kernel context in the CPU register, such as in a first set of registers. From this point, while the OS is running on the computing device, the kernel context can persist in the CPU register. For example, the CPU register can have a designated store space for the kernel context, and the CPU core can therefore perform kernel level operations without switching out contexts from the CPU register. The CPU also only needs to store two contexts simultaneously in some examples.

At stage 212, the application can launch. The application can be any application or service in the OS that runs on the user domain of the CPU core. The application can therefore have limited access to CPU operations. For example, the application can be prohibited from executing certain privileged instructions and accessing certain components of the computing device, such as other address spaces, memory management hardware, and I/O ports.

At stage 214, the application can send the user context to the CPU core. The user context can include operational state data and execution settings for performing operations on the CPU core for the application. At stage 216, the CPU core can store the user context in the CPU register, such as in a second set of registers. As mentioned previously, the kernel context can persist on the CPU register (e.g., in the first set of registers) while the OS runs on the computing device. The kernel context and user context can therefore both persist on the CPU register. The CPU core can therefore switch between kernel domain operations and user domain operations without switching out their corresponding contexts while still only executing one of the user and kernel threads at a time, in an example. This saves time with each domain switch because the CPU core does not have to retrieve any context data from the computing device's memory.

At stage 218, the application can request that the CPU core perform an operation. At stage 220, the CPU core can determine the permission level of the operation. For example, the CPU core can determine whether the operation can be performed with the user domain or if it requires the kernel domain. At stage 222, the CPU core can perform the operation using the proper context. For example, if the operation can be performed on the user domain, then the CPU core can perform the operation with the user context stored in the CPU register. Alternatively, if the operation requires the kernel domain, then the CPU core can perform the operation using the kernel context stored in the CPU register.

Although the examples above regarding FIGS. 1 and 2 describe a two-domain structure, other structures are possible. For example, computing devices with a hypervisor can use three privilege domains: a guest domain for user level applications and services (referred to throughout as "vmx-guest domain"), a guest kernel domain for a guest OS (referred to throughout as "vmx-non root domain"), and a hypervisor domain for the hypervisor (referred to throughout as "vmx-root domain"). In such a computing system, the vmx-root domain, like the kernel domain described above, can have unlimited access to the CPU. The vmx-non root and vmx-guest domains can have limited access to the CPU. The CPU can have enough storage space for the contexts of each domain, such as in three different sets of registers. In other words, a vmx-root context, a vmx-non root context, and a vmx-guest context can simultaneously persist in the CPU register. When an application on a guest operating system makes an operation request to the CPU that requires the vmx-root domain, the request can pass from the application to the guest OS, and from the guest OS to the kernel OS. Because all three contexts are stored on the CPU register, the CPU core can perform the context switches without having to retrieve any contexts from the computing device's memory. Likewise, vmx-non root operations can be performed at the guest OS level without switching contexts in and out of the CPU register.

In some examples, the computing device can include multiple guest OS's. In one such example, a first application on a first guest OS can have access to the CPU. The vmx root context, vmx-non root context of the first guest OS ("first vmx-non root context"), and the vmx-guest context of the first application ("first vmx-guest context") can be stored in the CPU register while the CPU performs operations for the first application. A second application on a second guest OS can request access to the CPU. The CPU can replace the first vmx-non root context and first vmx-guest context with the vmx-non root context of the second guest OS ("second vmx-non root context") and vmx-guest context second application ("second vmx-guest context"). In one example, the CPU can save the first vmx-non root context and vmx-guest context to the computer device's memory. Note that in all these examples above, the vmx-root context can remain in the CPU register.

Continuing the example above, a third application on the first guest OS can request access to the CPU while the first application has access to the CPU. In such an example, the CPU can replace the first vmx-guest context with the vmx-guest context of the third application ("third vmx-guest context"). Because the first and third applications are both associated with the first guest OS, the CPU can keep the first vmx-root context in the CPU register when switching between the first and third vmx-guest contexts.

In the examples described above relating to hypervisors and guest OSs, the CPU need only store three contexts simultaneously.

FIG. 3 is a flowchart of an example method for communications across privilege domains within a CPU core where user contexts stored in the CPU register are swapped out. At stage 310, the CPU core can store a kernel context in the CPU core. The kernel context can include operational state data and execution settings for kernel level operations on the CPU core. In an example, the kernel context can be a context of the computing device's OS. The kernel domain can give the OS unrestricted access to execute all instructions, including privileged instructions, and access otherwise restricted components of the computing device, such as different address spaces, memory management hardware, and input/output ("I/O") ports.

In an example, the kernel context can persist in the CPU register while the OS is running. The CPU can swap out user contexts on other privilege domains, but the kernel context can remain on the CPU register so that the CPU can perform kernel level operations without having to retrieve the kernel context from other memory sources on the computing device.

At stage 320, the CPU core can receive a request from a first application to perform a first operation that requires access to a first privilege domain. The first application, as well as the second application described below, can be an application running on the OS that has user domain access to the CPU. When the first application requests that the CPU perform an operation, the request can indicate the required privilege domain. Alternatively, the OS can identify the required privilege level based on the request. In one example, the request can include a flag that, if enabled, informs the CPU that kernel level access is required.

At stage 330, the CPU core can save a first user context to the CPU register that corresponds to the first application. The application can provide the first user context or the CPU can retrieve the first user context from a known location, depending on the example. As discussed previously, the kernel context can remain stored in the CPU register so that both the kernel context and first user context are stored in the CPU register at the same time.

At stage 350, the CPU core can execute the first operation using the proper context. For example, if the operation requires kernel level privileges, the CPU can execute the operation using the kernel context. Alternatively, if the operation can be performed with user domain privileges, the CPU can execute the operation using the first user context. The CPU can do this for each operation request while the first application has access to the CPU.

At stage 360, the CPU core can prefetch a second user context that corresponds to the second application. For example, the CPU include a preload queue for applications and services that are scheduled to access the CPU. If an application requests access to the CPU while the CPU is already in use, the CPU can schedule the application to access the CPU. While the application is waiting to access the CPU, the CPU can retrieve the application's user context from the memory and load it into the preload queue. In one example, the preload queue can have a designated storage space on the CPU register. In one example, the CPU can schedule the application to access the CPU after the user context has been loaded into the preload queue. This can minimize delays caused by the CPU retrieving a user context.

As an example, the while the first application has access to the CPU, the second application can request access. The CPU can schedule the second application to be given access after the CPU has loaded the second user context into the preload queue. While the CPU is retrieving the second user context from memory, the CPU can continue to execute operations for the first application. After the second context is loaded into the preload queue, the CPU can load the second context into the CPU register where it can use the second context to execute operations for the second application. This allows the CPU to continue performing operations while the second user context is being retrieved instead of idling during that time, thus maximizing usage of the CPU's resources.

Additionally, because the kernel context and first user context concurrently persist in the CPU register while the second user context is retrieved, the CPU does not need to stop executing if a context switch is required for the first application. The CPU can switch between the kernel context and user context as needed, continuing to execute operations for the first application while the second user context is prefetched.

At stage 370, the CPU core can replace the first user context with the second user context. In an example, the second user context can be loaded into the CPU register for a time interval that the CPU has scheduled the second application to have access to the CPU. In one example, the CPU can store the first user context in the computing device's memory. For example, if the first application has finished its use of the CPU, or if a third application has requested access to the CPU and is scheduled to access the CPU before the first application regains access, then the CPU remove the first user context from the CPU register entirely. Alternatively, if the first application is scheduled to access the CPU after the interval where the second application has access, then the first user context can be placed into the preload queue on the CPU register. This can save time that the CPU would normally spend saving the first user context to the memory and later retrieving it from the memory.

At stage 380, the CPU core can execute an operation for the second application. The context used to execute this operation can depend on the required privilege domain. Like with the first application, if the operation requires kernel domain, then the CPU can use the kernel context to perform the operation. Alternatively, if the operation can be executed on the user domain, then the CPU can execute the operation using the second user context.

FIG. 4 is another sequence diagram of an example method for communications across privilege domains within a CPU core, such as the method described above regarding FIG. 3. At stage 402, the CPU core can execute a boot sequence. For example, a user can power on or restart the computing device that the CPU belongs to. In an example, the CPU can execute a boot sequence code that causes the CPU to launch a BIOS or UEFI that initializes other hardware on the computing device and facilitates communication between the computing device's OS and hardware.

At stage 404, the CPU core can initialize the OS. For example, the CPU core can execute code that causes the OS to start loading. At stage 406, the OS can load. When the OS loads enough to begin sending instructions to the CPU core, the OS can send the kernel context to the CPU core at stage 408.

At stage 410, the CPU core can store the kernel context in the CPU register, in a first set of registers. From this point, while the OS is running on the computing device, the kernel context can persist in the CPU register. For example, the CPU register can have a designated store space for the kernel context, and the CPU core can therefore perform kernel level operations without switching out contexts from the CPU register. The CPU also only needs to store two contexts simultaneously.

At stage 412, the first application can request access to the CPU core. The first application can be any application or service in the OS that runs on the user domain of the CPU core. The first application can therefore have limited access to CPU operations. For example, the first application can be prohibited from executing certain privileged instructions and accessing certain components of the computing device, such as other address spaces, memory management hardware, and I/O ports. In an example, the request can include instructions to perform one or more operations associated with the first application.

At stage 414, the first application can send the first user context to the CPU core. The first user context can include operational state data and execution settings for performing operations on the CPU core for the first application. In an alternative example, instead of the first application sending the first user context to the CPU core, the CPU core can retrieve the first user context from a known location in the computing device's memory.

At stage 416, the CPU core can store the first user context in the CPU core, such as in a second set of registers. As mentioned previously, the kernel context can persist on the CPU register (e.g., in the first set of registers) while the OS runs on the computing device. The kernel context and first user context can therefore both persist on the CPU register even when only one thread or the other can execute at any one time. The CPU core can therefore switch between kernel domain operations and user domain operations without switching out their corresponding contexts. This saves time with each domain switch because the CPU does not have to retrieve any context data from the computing device's memory.

At stage 418, the second application can request access to the CPU core. The second application, like the first application, can operate on the user domain of the CPU core, and therefore be subject to the same limitations on the CPU core. In an example, the request can include instructions to perform one or more operations associated with the second application.

At stage 420, the CPU core can save the second user context to the OS preload queue. In an example, the preload queue can be a portion of CPU register where the CPU can save the user context of an application or service that is scheduled to access the CPU core. For example, when the second application launches, it can request access to the CPU core to perform operations. The CPU core can schedule to the second application for access to the CPU core. In one example, the CPU core can schedule the second application to be given access to the CPU core after the second user context is loaded into the preload queue. For example, after receiving an access or operation request from the second application, the CPU core can retrieve the second user context from the computer device's memory. While the retrieval is taking place, the CPU core can continue to execute operations for the first application. After the second user context is loaded into the preload queue, the CPU core can grant the second application access. In one example, the CPU core can wait until the second context is loaded into the preload queue to schedule when the second application can access the CPU core.

At stage 422, the CPU core can retrieve the second user context from the OS preload queue. For example, the CPU core can replace the first user context saved to the CPU register with data from the second user context saved to the preload queue. For example, the second user context can be saved to the second set of registers. Note that the kernel context remains saved in the CPU register in the first set of registers.

At stage 424, the CPU core can save the first user context to the OS preload queue. This can occur in instances where the first application is scheduled to access the CPU core again after the designated access interval for the second application. However, if the first application has no more operations to perform on the CPU core, or if a third application or service is scheduled to access the CPU core after the second application, then the CPU core can save the first user context to the computing device's memory.

At stage 426, the CPU core can determine the permission level of the operations instructions from the second application. For example, for each instruction, the CPU core can determine whether the corresponding operation can be performed with the user domain or if it requires the kernel domain. At stage 428, the CPU core can perform the operation using the proper context. For example, for operations that can be performed on the user domain, the CPU core can execute those operations using the second user context saved in the CPU register. When the kernel domain is required for an operation, the CPU can use the kernel context saved in the CPU register.

FIG. 5 is an illustration of an example system for performing communications across privilege domains within a CPU core. A computing device 510 can include a CPU 520. The CPU 520 can be a physical component of the computing device 510 that executes instructions for computer programs. The computing device 510 can be one or more processor-based devices, such as a server, personal computer, tablet, or cell phone. The computing device can also include a memory 530, which can be a physical component of the computing device 510 that stores data. For example, the memory 530 can include RAM, a hard drive, or both. An OS 540 and an application 550 can be types of software stored on the computing device 510, such as on the memory 530. The OS 540 can be system software that manages computer hardware, software resources, and provide services for computer programs. The application 550 can be an example of such a computer program that runs on the OS 540. In one example, the computing device 510 can also include a hypervisor that provides a platform for virtual machines ("VMs") to operate. In such an example, the computing device 510 can include multiple guest OSs that correspond to the OS 540.

In an example, the CPU 520 can utilize a privilege domain architecture that includes two or more hierarchical access domains. The highest domain can grant unrestricted access to execute all instructions, including privileged instructions, and access otherwise restricted components of the computing device, including, for example, different address spaces, memory management hardware, and I/O ports. In one example, the highest domain can be limited to the kernel of the OS 540. This level is referred to throughout as the "kernel level" or "kernel domain." Other applications and services, such as the application 550, can be restricted to lower access domains, which are referred to throughout as a "user level" or "user domain." The user domains can be prohibited from performing certain operations on the processor, such as those described above.

In an example, the CPU 520 can store the kernel context 522 of the OS 540 on the CPU 520 itself, as opposed to storing the kernel context in the memory 530. The CPU 520 can also store a user context 524 at the same time. The user context 524 can be a context that is associated with the application 550 and provides the CPU 520 with the necessary operational data to execute instructions from the application 550. In an example, the CPU 520 can load the user context 524 into the CPU 520 when the application 550 requests access to the CPU 520. In one example, the user context 524 can be retrieved from the memory 530. In another example, the kernel context 522 and user context 524 can be saved in the CPU's register. It follows that the CPU 520 must have sufficient storage space to store at least the kernel context 522 and user context 524 in addition to any other data required to operate.

In an example, the CPU 520 can be configured to execute instructions from the application 524 according to the privilege domain architecture. For example, for operations that can be executed on the user domain, the CPU 520 can execute corresponding instructions with the user context 524. Alternatively, for operations requiring the kernel context, the CPU 520 can execute the corresponding instructions with the kernel context 522. Note that the CPU 520 can switch between contexts without needing to remove or retrieve additional context data for the OS 540 or the application 550. The CPU also only needs to store two contexts simultaneously.

In some examples, the CPU 520 can include multiple cores. In such examples, the CPU 520 can include enough storage space to store a user context 524 for each core. In one example, the CPU 520 can include enough storage space to store the kernel context 522 for each core. Alternatively, the kernel context 522 can be stored in a single location that each core can access.

In some examples, the computing device 510 can also include a hypervisor. In such examples, the OS 540 can be to a guest OS managed by the hypervisor, and the application 550 can be an application on the guest OS. In an example, hypervisor can operate on the highest access domain for the CPU 520. Accordingly, the CPU 520 can store the hypervisor's context (vmx-root) in the CPU 520. The CPU 520 can have enough storage space to also store the OS's 540 context (vmx-non root context) and the application's 550 context (user context 524). In one example, the vmx-root context can persist in the CPU 520 regardless of the vmx-non root context or user context stored in the CPU 520. For example, if the computing device 510 has a hypervisor and a single OS 540, then the vmx-root and vmx-non root contexts can persist in the CPU 520, and the CPU 520 can switch out user contexts 524 as needed. Requests from the application 550 can go from user context 524, to vmx-non root context, to vmx-root context and back without retrieving or removing any context data. In these hypervisor examples, the CPU also only needs to store three contexts simultaneously.

FIG. 6 is an illustration of the example system of FIG. 5 where multiple applications access the CPU 520 simultaneously. Applications A 610 and B 620 can be computer programs that run on the OS 540. The user context A 612 can be the user context for the application A 610 and the user context B 622 can be the user context for the application B 620. In an example, the kernel context 522 can persist on the CPU 520. Initially, the application A 610 can have access to the CPU 520, and the user context A 612 can be stored on the CPU 520. While the application A 610 has access to the CPU 520, the CPU 520 can execute instructions from the application A 610 using the appropriate context based on the required privilege domain. The user context B 622 can be stored in the memory 530.

The dotted lines illustrate changes that can occur if the application B 620 requests access to the CPU 520. For example, if the CPU 520 receives an indication that the application B 620 needs to access the CPU 520, the CPU 520 can retrieve the user context B 622 from the memory 530 while the CPU 520 continues to execute instructions from the application A 610. The CPU 520 can load the user context B 622 into a preload queue 630, which can be a storage area on the CPU 520 where the CPU 520 stores contexts for applications or services scheduled to access the CPU 520. When the application B's 620 scheduled time to access the CPU 520 arrives, the CPU 520 can move the user context A 612 from the CPU 520 to the memory 530 and load the user context B 622 into the CPU's register. The CPU 520 can then execute instructions from the application B 620, switching privilege domains when necessary without retrieving any additional context data. The CPU also only needs to store two contexts simultaneously in some examples. In other examples, such as when an application executes on a hypervisor, three or more contexts can be stored in the CPU core. In one example where the application A 610 is scheduled to access the CPU 520 again after the application B 620, the CPU 520 can place the user context A 612 into the preload queue 630 instead of the memory 530.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for communications across privilege domains within a central processing unit ("CPU") core, comprising:
    storing a first context in a first set of registers in the CPU core, the first context corresponding to an operating system kernel, wherein the operating system kernel runs on a first privilege domain that allows full access to CPU operations;
    receiving a first request from a first application to perform a first operation, the first operation requiring access to the first privilege domain; and
    storing a second context in a second set of registers in the CPU core while the first context is stored in the first set of registers in the CPU core, the second context corresponding to the first application, wherein the CPU executes instructions using one of the first and second contexts at a time while both contexts persist in the first and second sets of registers.

2. The method of claim 1, wherein the first and second contexts include at least one of a stack pointer, a page table, and a program counter.

3. The method of claim 1, wherein the first application uses a second privilege domain that allows limited access to CPU operations.

4. The method of claim 1, wherein the operating system kernel is a guest kernel for an operating system for a virtual machine.

5. The method of claim 4, further comprising storing a third context in the CPU core, the third context corresponding to a hypervisor that manages the operating system of the virtual machine.

6. The method of claim 1, further comprising:
receiving a second request from a second application to perform a second operation;
prefetching a third context, the third context corresponding to the second application;
saving the second context in a memory;
storing the third context in the CPU core while the first context remains in the first set of registers in the CPU core;
and executing the second operation using the third context.

7. The method of claim 1, further comprising:
after executing the first operation, storing the first context in the first set of registers in the CPU core again; and
loading the second context from the CPU core.

8. A non-transitory, computer-readable medium containing instructions that, when executed by a hardware-based processor, performs stages for communications across privilege domains within a central processing unit ("CPU") core, the stages comprising:
storing a first context in a first set of registers in the CPU core, the first context corresponding to an operating system kernel, wherein the operating system kernel runs on a first privilege domain that allows full access to CPU operations;
receiving a first request from a first application to perform a first operation, the first operation requiring access to the first privilege domain; and
storing a second context in a second set of registers in the CPU core while the first context is stored in the first set of registers in the CPU core, the second context corresponding to the first application, wherein the CPU executes instructions using one of the first and second contexts at a time while both contexts persist in the first and second sets of registers.

9. The non-transitory, computer-readable medium of claim 8, wherein the first and second contexts include at least one of a stack pointer, a page table, and a program counter.

10. The non-transitory, computer-readable medium of claim 8, wherein the first application uses a second privilege domain that allows limited access to CPU operations.

11. The non-transitory, computer-readable medium of claim 8, wherein the operating system kernel is a guest kernel for an operating system for a virtual machine.

12. The non-transitory, computer-readable medium of claim 11, the stages further comprising storing a third context in the CPU core, the third context corresponding to a hypervisor that manages the operating system of the virtual machine.

13. The non-transitory, computer-readable medium of claim 8, the stages further comprising:
receiving a second request from a second application to perform a second operation;
prefetching a third context, the third context corresponding to the second application;
saving the second context in a memory;
storing the third context in the CPU core while the first context remains in the first set of registers in the CPU core;
and executing the second operation using the third context.

14. The non-transitory, computer-readable medium of claim 8, the stages further comprising:
after executing the first operation, storing the first context in the first set of registers in the CPU core again; and
loading the second context from the CPU core.

15. A central processing unit ("CPU") core for communications across privilege domains, comprising:
a first context stored in a first set of registers in the CPU core, the first context corresponding to an operating system kernel of an operating system, wherein the operating system kernel runs on a first privilege domain that allows full access to CPU operations;
a second context stored in a second set of registers in the CPU core, the second context corresponding to a first application installed on the operating system;
instructions that, when executed by the CPU core, performs stages comprising executing instructions using one of the first and second contexts at a time while both contexts persist in the first and second sets of registers.

16. The system of claim 15, wherein the first and second contexts include at least one of a stack pointer, a page table, and a program counter.

17. The system of claim 15, wherein the first application uses a second privilege domain that allows limited access to CPU operations.

18. The system of claim 15, wherein the operating system kernel is a guest kernel for an operating system for a virtual machine.

19. The system of claim 18, the stages further comprising storing a third context in the CPU core, the third context corresponding to a hypervisor that manages the operating system of the virtual machine.

20. The system of claim 15, the stages further comprising:
receiving a request from a second application to perform an operation;
prefetching a third context, the third context corresponding to the second application;
saving the second context in a memory;
storing the third context in the CPU core while the first context remains in the first set of registers in the CPU core;
and executing the requested operation using the third context.

* * * * *